March 17, 1953     H. J. HORN     2,631,894
VEHICLE WHEEL

Filed May 14, 1948     2 SHEETS—SHEET 1

INVENTOR.
HARRY J. HORN
BY
Barnes, Kisselle, Laughlin & Raisch
ATTORNEYS.

*INVENTOR.*
HARRY J. HORN
BY Barnes, Kisselle, Laughlin & Raisch
ATTORNEYS

Patented Mar. 17, 1953

2,631,894

UNITED STATES PATENT OFFICE 2,631,894

VEHICLE WHEEL

Harry J. Horn, Lansing, Mich., assignor to Motor Wheel Corporation, Lansing, Mich., a corporation of Michigan Application May 14, 1948, Serial No. 27,020

3 Claims. (Cl. 301—9)

This invention relates to a metal vehicle wheel which is either stamped or forged and in particular is concerned with a stamped or forged metal wheel which has a strong bolting-on flange.

This invention contemplates a stamped or forged disc type metal vehicle wheel wherein the disc is of substantially uniform thickness throughout the bolting-on flange and the body part of the disc which attaches to the wheel rim.

It is an object of this invention to produce such a disc type metal vehicle wheel from relatively thin sheet metal stock and form the bolting-on flange with such contour that it has the strength necessary to withstand the severest loads and stresses to which it is subjected in usage.

The invention contemplates a disc type metal vehicle wheel which is demountable and can be mounted either singly or dual.

Figure 2:
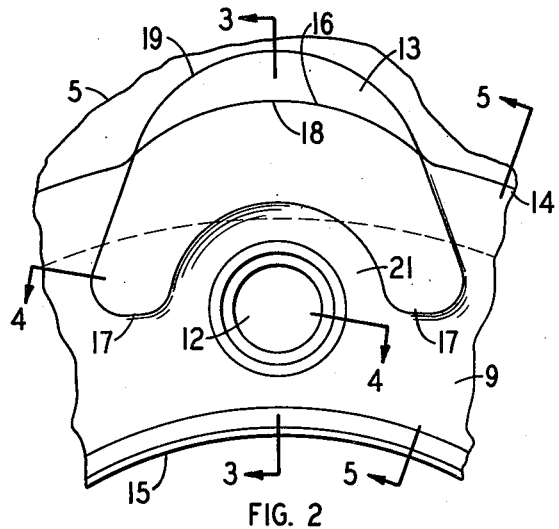
Fig. 2 is an elevation of a portion of the center of the wheel in the region known as the "bolting-on flange."
Figure 3:
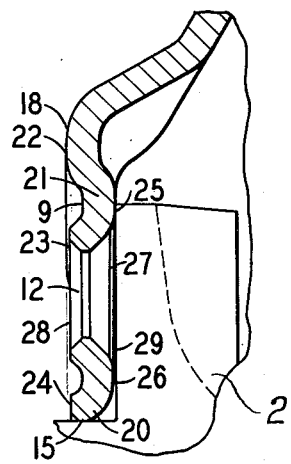
Figure 4:
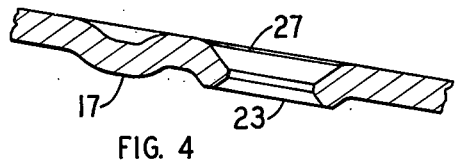
Figure 5:
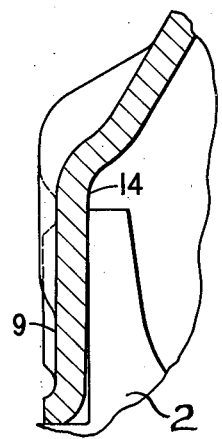

Figs. 3, 4 and 5 are sections along the lines 3—3, 4—4 and 5—5 of Fig. 2.

Figure 6:
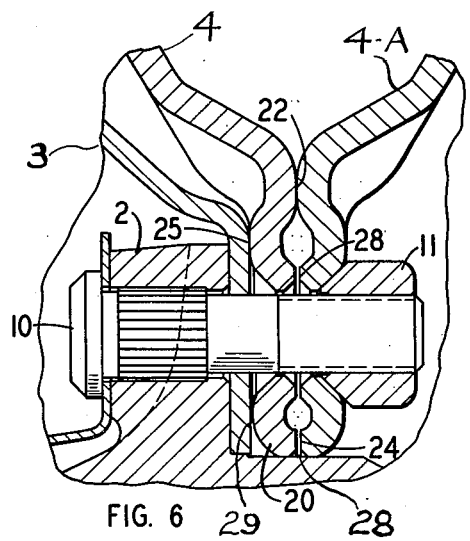

Fig. 6 is an enlarged fragmentary sectional view of a bolt and the adjacent portions of the bolting-on and hub flanges before the nut is drawn tight.

Referring more particularly to the drawings there is shown a dual wheel assembly comprising a hub 1, hub flange 2, brake drum 3 and two identical vehicle wheels generally designated 4 and 4-A, wheel 4-A being mounted on the hub in reversed position to wheel 4. Each wheel comprises a forged or stamped disc body 5 which is preferably dished, that is, of concavo-convex form, a tire rim 6 secured by rivets 7 to the circumferential edge 8 of the wheel body 5, and a bolting-on flange generally designated 9. The wheels 5 are secured to the hub 1 by any known means, such as cap screws or bolts and nuts. For purposes of illustration, the wheels are secured to the flange 2 of hub 1 by means of a plurality of bolts 10 and nuts 11, bolts 10 passing through the bolt holes 12 in the bolting-on flange 9.

In operation a vehicle wheel must be able to stand considerable torsional and lateral or axial stresses and therefore it is necessary that these stresses should not be concentrated in any one localized area, at any one point or along any one line but should be distributed over a substantial area of the wheel body. To accomplish this end I have provided a generally U-shaped embossment 13 which extends across the circumferential junction of the body portion 5 with the bolting-on flange 9 of the wheel. This circumferential junction of the body and bolting-on flange portions can be generally designated 14. A U-shaped embossment 13 is provided for each of the bolt openings 12.

My wheel will be provided with a conventional number of bolt openings 12 equi-spaced about the inner circumference 15 of the wheel. It is customary to provide a wheel with seven or eight of these bolt openings.

Each U embossment 13 has its bight portion 16 positioned on the same radius as its adjacent bolt hole 12. The ends 17 of each U embossment 13 are positioned on opposite sides of the adjacent hole 12 and are positioned on substantially the same circumference as the center of the hole 12. The embossment 13 has its greatest width at the bight portion 16 and is narrowest at the ends 17. Each embossment 13 has its greatest depth at approximately the central point 18 of the bight portion 16 and from the point 18 the embossment decreases in depth toward its perimeter 19 where the embossment merges into the body portion 5 and bolting-on flange portion 9 of the wheel.

The wheel is provided with a bead 20 extending completely around its inner circumference 15, Fig. 3. The wheel is also provided with a semi-circular bead 21 extending from end to end 17 of embossment 13 and between embossment 13 and the adjacent opening 12.

By referring particularly to Fig. 3 it should be noted that each embossment 13 has a fulcrum area 22 which projects outwardly from the wheel, for example, in the neighborhood of .015 inch, beyond the outer face 23 of the bolt hole 12 and the outer face 24 of the bead 20. Similarly on the inner face of the wheel the inner face 25 of the bead 21 extends inwardly of the wheel in the neighborhood of .015 inch beyond the inner face 26 of bead 20 and the inner face 27 of hole 12. This first clearance is indicated by line 28, Figs. 3, 6, and the second clearance is indicated by line 29, Fig. 3. As used herein, the inner face of the wheel means the concave side of the disc body 5 whereas the outer side of the wheel refers to the convex face of the disc body 5.

Figure 1:
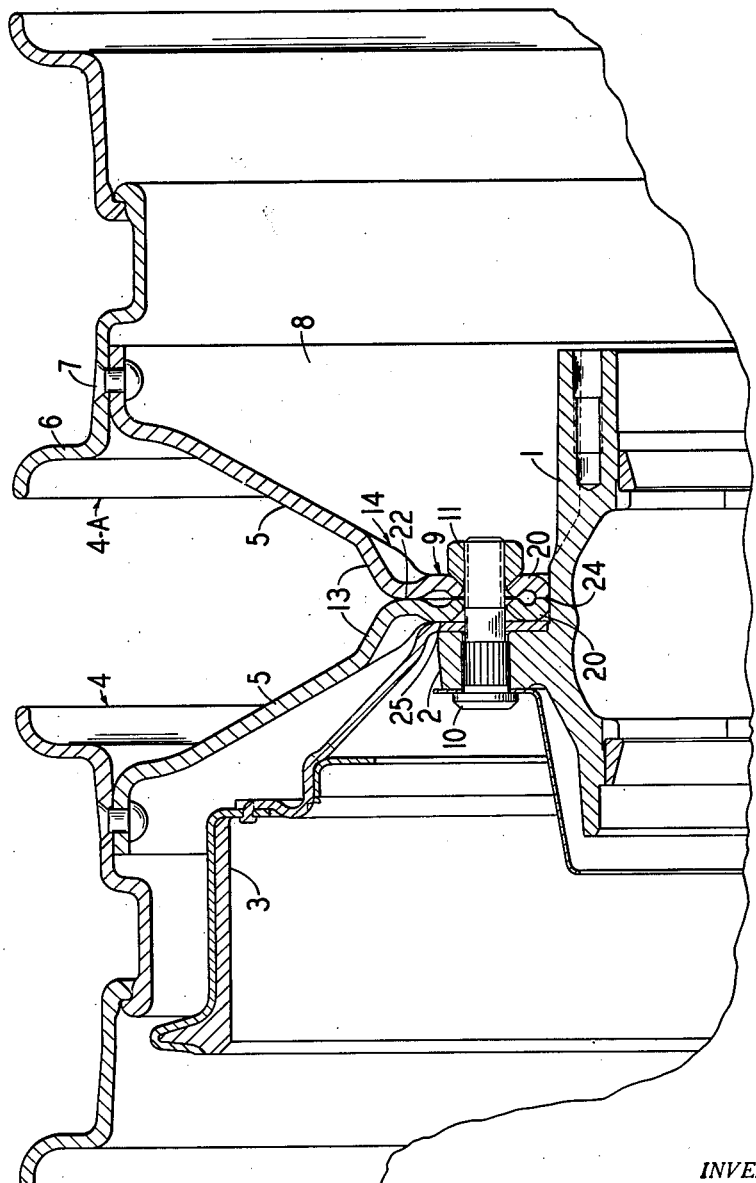
Fig. 1 is a cross sectional view showing approximately one-half of a dual wheel mounting.

The importance of these clearances represented by lines 28 and 29 can be seen by reference to Fig. 1. The wheel assembly can be made either with or without a brake drum 3 and the brake drum 3 forms no part of the invention here under consideration. If a brake drum 3 is used, as shown in Figs. 1 and 6, then the inner wheel will bear against the brake drum instead of against the hub flange. If no drum is used or if the brake drum is mounted on the other side of the hub flange, then the inner wheel will actually contact the hub flange. When the brake drum 3 is used in the position shown in Figs. 1 and 6, then to all intents and purposes the portion of the brake drum in contact with hub flange 2 becomes a part of the hub flange and when the bolting-on flange of the wheel is described as positioned against the hub flange, then this phrase is used broadly to cover either of the above situations where the wheel bolting-on flange bears directly against the hub flange or bears against the brake drum, as shown in Fig. 1.

When the wheels are positioned in dual relation upon the hub 1, the inner wheel 4 has its fulcrum points 25 positioned against the hub flange 2 and the outer wheel 4-A has its fulcrum points 22 positioned against the fulcrum points 22 of the inner wheel 4. Thus, before nuts 12 are tightened down there will be a clearance 29 between the hub flange 2 and bead 20 of inner wheel 4 and a clearance 28 between the faces 24 of beads 20 of wheels 4 and 4-A. When nuts 11 are turned down, these clearances will be eliminated so that the bolting-on flange of the inner wheel 4 fulcrums about points 25 until its bead 20 contacts hub flange 2 and the bolting-on flange of the outer wheel 4-A fulcrums about points 22 until the edge 24 of bead 20 of the outer wheel 4-A is drawn tightly against the corresponding edge of bead 20 of inner wheel 4. This pre-loads the bolting-on flanges 9 of both wheels and thus distributes any side or lateral stresses around the circumference in the general area of fulcrum points 22 and 25 and avoids concentration of these lateral or axial stresses in the area of the wheel immediately adjacent the bolt holes 12. The U-shaped embossments 13 further distribute the axial and torsional stresses to which the wheel disc is subjected over a wide area and greatly strengthen the junction area between the bolting-on flange 9 and the axial body 5.

My wheel can be mounted on the hub dual using two wheels or singly using one wheel. There is but one dual mounting, which is shown in Fig. 1. There are two single mountings. One single mounting is the same as the wheel 4 of Fig. 1 with wheel 4-A left off and the nuts 11 being screwed down against the bolting on flange 9. The other single mounting is the wheel in the same position as 4-A of Fig. 1 with the wheel 4 left off and the nut 11 screwed down against the bolting on flange 9.

When the wheels are mounted dual, as illustrated in Fig. 1, the U-shaped embossments 13 will bear against each other along a median U-shaped line extending from one end 17 to the other end 17 of each embossment, the bearing surfaces, of course, being on the convex faces of the embossments 13. The inner face 25 of the bead 21 of the inner wheel bears against the hub flange 2 and before the nuts 11 are tightened there is a small clearance 29 between the face of the bead 20 and the wheel hub. There is also a clearance 28 between the bead 20 of the outer wheel and the bead 20 of the inner wheel at the surfaces 24 before the nuts 11 are tightened. After the nuts are tightened bead 25 and bead 20 of the inner wheel contact the hub flange 2. Embossment 13 of the outer wheel contacts the embossment 13 of the inner wheel and bead 20 of the outer wheel contacts the bead 20 of the inner wheel. It will thus be seen that as the nuts are tightened the bolting-on flange on each wheel is flexed, or put under stress, the inner wheel between the two bearing surfaces against the hub flange and the outer wheel between the two bearing surfaces against the inner wheel. As has been explained previously, the contact between bead 20 and the hub flange and the contact between the two beads are continuous.

When the wheel is mounted singly in the position of wheel 4, the surface 25 of bead 21 contacts the hub flange and when the nut is tightened the bolting on flange 9 flexes and the flange 20 is forced into contact with the hub flange 2. It will thus be seen that the wheel flange 9 is flexed between the two contacts against the hub flange.

When the wheel is mounted singly in the position of wheel 4-A the lower portion of the embossment 13 near the ends 17 contact the hub flange 2 and when the nuts are tightened the wheel flange 9 is flexed and the bead 20 contacts the hub flange 2. It will thus be seen that the wheel flange is flexed between its two contacts with the hub flange 2.

It is thus seen that the embossments 13 provide for proper flexing of the bolting on flange in both the dual and the single mounting. They also provide bearing surfaces which effect a very secure mounting and a uniform distribution of stresses so that the wheel mounting will remain tight under all manner of usage and there will be no localized stresses which would tend to decrease the life of the wheel.

I claim:

1. A wheel disc comprising a substantially radially extending central annular bolting on flange and a body portion outwardly of said flange, said flange having a plurality of circumferentially spaced openings adapted to receive securing means, said flange and body portion being provided at their junction with a plurality of circumferentially spaced embossments, each embossment being substantially U-shaped with the ends of each U embossment positioned on the opposite sides of one of said openings and closer to the inner circumference of said annular bolting on flange than the bight portion of said embossment, said U embossment having its greatest depth in its bight portion and substantially at the junction of the bolting on flange with the body portion, each said embossment extending across the circumferential junction of said flange and body portion, said bolting on flange having a semi-circular inwardly projecting bead between each opening and its contiguous U embossment, the inner face of said semi-circular bead projecting inwardly a few thousandths of an inch more than the innermost face portions of the bolting on flange positioned radially inwardly of said semi-circular beads, a hub flange provided with a plurality of circumferentially spaced openings corresponding to the above specified openings in the bolting on flange, and securing means adapted to be received in said openings for detachably clamping the wheel flange to the hub flange whereby when the disc is mounted upon the hub flange with the semi-circular inwardly projecting beads toward the hub flange the clamping action of the securing means flexes the bolting on flange about said semi-circular inwardly projecting beads.

2. A wheel disc comprising a substantially radially extending central annular bolting-on flange and a body portion outwardly of said flange, said flange having a plurality of circumferentially spaced openings adapted to receive securing means, said flange and body portion being provided at their junction with a plurality of circumferentially spaced similar embossments, each embossment being substantially U-shaped with the ends of each U embossment positioned on the opposite sides of one of said openings and closer to the inner circumference of said annular bolting-on flange than the bight portion of said embossment, said U embossment having its greatest depth in its bight portion and substantially at the junction of the bolting-on flange with the body portion, each said embossment extending across the circumferential junction of said flange and body portion, the said bolting-on flange being provided with a semi-circular inwardly projecting bead between each opening and its contiguous U embossment, the inner face of said semi-circular bead projecting inwardly a few thousandths of an inch more than the innermost face portions of the bolting-on flange positioned radially inwardly of said semi-circular beads.

3. A wheel disc comprising a substantially radially extending central annular bolting-on flange and a body portion outwardly of said flange, said flange having a plurality of circumferentially spaced openings adapted to receive securing means, said flange and body portion being provided at their junction with a plurality of circumferentially spaced similar embossments, each embossment being substantially U-shaped with the ends of each U embossment positioned on the opposite sides of one of said openings and closer to the inner circumference of said annular bolting-on flange than the bight portion of said embossment, said U embossment having its greatest depth in its bight portion and substantially at the junction of the bolting-on flange with the body portion, each said embossment extending across the circumferential junction of said flange and body portion and projecting outwardly a few thousandths of an inch more than the outermost face portions of the bolting-on flange positioned radially inwardly of said embossment, said bolting-on flange being provided with a bead which extends completely around the inner circumference of said bolting-on flange.

HARRY J. HORN.

REFERENCES CITED

The following references are of record in the file of this patent:

UNITED STATES PATENTS

| Number | Name | Date |
|---|---|---|
| Re. 21,960 | Stough | Nov. 25, 1941 |
| 2,130,392 | Horn | Sept. 20, 1938 |
| 2,317,311 | Stough | Apr. 20, 1943 |
| 2,407,749 | Sinclair | Sept. 17, 1946 |
| 2,424,106 | Martens | July 15, 1947 |